UNITED STATES PATENT OFFICE.

NIELS C. CHRISTENSEN, OF SALT LAKE CITY, UTAH.

PROCESS OF TREATING SULPHIDE ORES OF ZINC.

No Drawing.   Application filed February 16, 1920.   Serial No. 359,103.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Sulphide Ores of Zinc, of which the following is a specification.

This invention relates to the treatment of sulphide ores of zinc. It is applicable to all classes of these ores but is especially suited to the treatment of the so-called complex zinc-lead ores containing the zinc sulphide intimately mixed with other sulphide minerals such as galena, chalcopyrite, pyrite, etc.

The object of the process is to recover the zinc in a relatively clean product and to leave the residue of ore in such form as to be suitable for the recovery of the other metals therefrom.

As is well known to all metallurgists, the treatment of the complex sulphide ore containing zinc is a metallurgical problem of great importance as no satisfactory process has as yet been commercially used which makes an economical saving of the zinc in a good product and also of the lead, copper, gold and silver in the ore.

By my process I secure a practically complete extraction of the zinc from these ores and leave the other constituents in such a form that they may be readily treated for the recovery of the gold, silver, lead and copper contents.

The process secures these results without roasting the ores and by the methods of hydrometallurgy rather than of pyrometallurgy.

My process consists in a general way in treating the comminuted ore with an excess of hot relatively concentrated sulphuric acid thereby sulphating the zinc, thereafter dissolving out the zinc sulphate and residual sulphuric acid with water, thereafter concentrating this solution until the acid reaches a strength of approximately 60% (or more) $H_2SO_4$ and thereby precipitating the zinc as zinc sulphate. This zinc sulphate is then separated from the excess acid by filtration or settling and the acid remaining with the zinc sulphate is removed in a suitable slow temperature kiln or dryer giving anhydrous zinc sulphate. The residual ore from this treatment may then be treated with hot acid brine for the recovery of the lead and silver, and the pyrite (or chalcopyrite) recovered from the tailings from this treatment by flotation; or this residue may be treated with $H_2S$ to sulphidize the lead sulphate and silver, and the gold, silver, lead and pyrite (or chalcopyrite) then be separated from the gangue by flotation.

It is well known that zinc sulphide may be converted to zinc sulphate by treatment with hot concentrated sulphuric acid but in all the older processes utilizing this fact the great difficulties have been encountered in the sulphating of all the other sulphide minerals and in the recovery of the zinc from the treated ore in a clean product. The older methods resorted largely to the methods of pyrometallurgy rather than hydrometallurgy in that the ores were treated in furnaces in such a manner as to drive off all the excess acid so that the zinc sulphate could be washed out of the residue, resulting in the sulphatization of most, if not all, of the sulphides in the ore and the contamination of the zinc product with a large amount of impurities.

By my process these difficulties are avoided by not driving off the excess acid from the ore and by precipitating the zinc sulphate from the acid solution by a new and simple method.

I have found that hot sulphuric acid of a concentration over 60% $H_2SO_4$ will act rapidly upon the zinc sulphide minerals forming zinc sulphate and dissolving the zinc sulphate if sufficient acid is used. The zinc sulphate may then be recovered by separating the hot pregnant acid from the residue of ore and cooling the acid and precipitating the zinc sulphate.

I have found that the most suitable strengths of acids for this method of treatment are those between 60% and 70% $H_2SO_4$ as stronger acids also dissolve the lead in the ore, and therefore prevent the separation of the lead and zinc. This treatment requires a large proportion of acid since the solubility of the zinc sulphate in these hot acids is relatively low. It is the object of this invention to avoid the use of so large a volume of acid and by this new process I am enabled to use more concentrated acids in much smaller proportion and yet secure a separation of the zinc from the lead and other metals of the ore. My new process also avoids the necessity of complete solution of the zinc sulphate in the acid.

All these features result in a very considerable reduction in the size of apparatus for a given capacity for ore treatment and therefore in the cost of apparatus and in the cost of operation of the mills using the process.

The process consists in agitating or mixing the comminuted ore with hot concentrated sulphuric acid containing over 50% sulphuric acid, preferably at a temperature near the boiling point of the acid, in such amount and for such a length of time as to completely change the zinc sulphide to zinc sulphate. As noted any strength of acid above 60% may be used, but I prefer to use acids of a concentration near 95% $H_2SO_4$ since a much smaller amount of acid may be used, and a much shorter time of treatment is needed. For example with 60% $H_2SO_4$ practically all the zinc sulphate must be dissolved in order to secure a complete extraction of the zinc, and this requires a large volume of acid. With 95% acid a very much smaller amount of acid may be used and much of the zinc sulphide is changed to sulphate without going into solution in the acid. With 60% acid a thirty minute treatment is usually sufficient whereas with 95% acid a five minute treatment is long enough with many ores. Sufficient hot acid should be used to dissolve most of the zinc as otherwise the zinc sulphate formed coats the zinc sulphide particles and prevents their conversion to zinc sulphate.

After the zinc sulphide has been changed to sulphate the mixture of ore and acid is cooled so as to precipitate the zinc sulphate from the excess acid and part of the excess acid is then preferably separated from the mixture of ore residue and zinc sulphate by filtration or decantation. This excess acid is then used in the treatment of more ore so that no zinc, lead, or silver in the solution is lost. The amount of excess acid will of course depend on the percentage of zinc in the ore and the strength of acid used, the stronger the acid the smaller the excess and the larger the amount of zinc the larger the excess. If the ore carries only a small amount of zinc it may not be necessary to remove any excess of acid.

The cold mixture of ore residue zinc sulphate and sulphuric acid remaining from the above treatment is now washed with water to remove the zinc sulphate and sulphuric acid. This gives a relatively strong solution of zinc sulphate containing sulphuric acid. The separation of the zinc sulphate from this acid solution is secured in the following novel manner. I have found that cold sulphuric acids of a concentration above 55% or 60% $H_2SO_4$ are able to carry only a very small amount of zinc in solution as sulphate, an amount less than three tenths of a per cent zinc at 30° C. At the boiling points of sulphuric acid of different concentrations the solubility of the zinc as a sulphate increases from approximately one and one half per cent zinc in 60% acid to approximately eight per cent zinc in 98% acid. Below 60% acid the solubility of the zinc as a sulphate increases rapidly with decrease in the percentage of $H_2SO_4$ in the acid solution. I take advantage of this difference in solubility to remove the zinc sulphate from the solution secured in my process, by concentrating the relatively dilute acid solution containing the zinc sulphate up to approximately 60% $H_2SO_4$ and thereby precipitating out the zinc as zinc sulphate. After this concentration operation the 60% acid may be cooled so as to leave as little of the zinc in solution as possible and the zinc sulphate is allowed to settle out (or is filtered out) and the cold acid is then concentrated to the desired strength used in preliminary treatment of the ore and used again in the process for the treatment of more ore. With ores containing any considerable percentage of zinc it may not be necessary, however, to cool the 60% acid solution to precipitate the last part of zinc sulphate since enough of the zinc sulphate will be precipitated by the concentration to 60% acid to give a high recovery from the acid. In this case the precipitated zinc sulphate is merely separated from the hot 60% acid and this concentrated to 95% (or any other desired strength above 60%) and used to treat more ore.

The acid solution may be concentrated above 60% acid and cooled before separating the zinc sulphate if desired, but the stronger acids such as 98% acid give a bulky precipitate probably containing $ZnSO_4 + XH_2SO_4$ whereas the acid of lower concentration give a precipitate consisting mainly of $ZnSO_4 - 1H_2O$ which is much more easily handled.

The zinc sulphate thus precipitated carries some $H_2SO_4$ mixed with it which is preferably removed by heating and driving off the $H_2SO_4$ as $SO_3$ and $H_2O$ leaving the zinc sulphate as a dry anhydrous zinc sulphate. The $SO_3$ from this drying operation is absorbed in the excess of acid from the foregoing treatments and used again in the process.

The action of the foregoing acid treatment on the minerals depends upon the strength of acid and the time of treatment. Hot 60% sulphuric acid will dissolve all the zinc sulphide if used in sufficient quantities in less than a half hour treatment. This treatment also sulphates a small part of the galena especially on the surface of the particles so that the galena does not float well unless sulphidized. No lead is dissolved by this strength of acid however. The pyrite is untouched by this strength acid. None of the silver in the ore is dissolved by acid of this strength. With hot 75% $H_2SO_4$ the action is more rapid requiring less than 20 minutes treatment with most ores to dissolve the zinc. This acid sulphates most of the galena and some of the silver and the hot acid dissolves some lead which is mostly precipitated upon cooling. The pyrite is untouched. With hot 95% acid the action is very rapid, five minutes treatment being sufficient for sulphating the zinc in most ores. Acid of this strength sulphates practically all the lead and silver and dissolves the lead and silver. There is also a very slight action on the pyrite (or chalcopyrite) but unless the time of treatment is prolonged the action is very slight. From the foregoing it will be noted that with the stronger acids some of the silver is sulphated and may be washed out with the zinc sulphate. As a rule however, there is sufficient $H_2S$ or $SO_2$ remaining after the acid treatment to precipitate the silver when the ore residue is being washed with water to remove the zinc sulphate and $H_2SO_4$. If the precipitation is not complete however, the silver may be precipitated in the pulp from the acid treatment by means of a small amount of $H_2S$ or $ZnCl_2$ or other chloride during this washing operation or may be precipitated from the acid zinc sulphate solution by the addition of a very small amount of soluble chloride preferably $ZnCl_2$. Any lead sulphate dissolved in the concentrated acid left in the pulp will be precipitated in the pulp by the dilution of the acid in the washing out of the acid and zinc sulphate, and therefore the zinc sulphate produced will be free from any lead or silver. The silver and lead carried by the residual concentrated acid from the acid treatment will of course be returned with the acid to the treatment of more ore and not be lost.

The residue of ore from the foregoing treatment may be treated with hot acid brine for the recovery of the lead and silver, and the pyrite may be recovered from the residue from this brine treatment by flotation. The acid brine gives a complete extraction of the lead and silver and the pyrite is so thoroughly cleaned by the acid treatments that it floats very readily, giving a high recovery by flotation.

If it is not desired to use the brine treatment the pyrite may be separated from the ore residue by flotation in a slightly acid solution, the galena and silver sulphide which are either completely sulphated or partially sulphated upon the surface of the particles by the sulphuric acid treatment do not float with the pyrite but may be separated from the residue by flotation after a short sulphidizing treatment with $H_2S$ or a soluble sulphide such as $Na_2S$ or calcium sulphide, thus making a separation between the pyrite and the lead and silver. If it is not desired to separate the lead and silver from the pyrite, the lead and silver may be first sulphidized and then floated together with the pyrite.

By my process I make a practically complete separation of the zinc from the complex sulphide ores of zinc in a relatively clean product free from lead and also recover practically all the gold, silver, lead and copper in high grade products free from zinc. As all metallurgists will appreciate this constitutes a much needed improvement in the treatment of ores of this character.

Having described my process, what I claim and desire to patent is:

1. The process of treating sulphide ores of zinc which consists in mixing said comminuted ores and the like with an excess of hot concentrated sulphuric acid and thereby changing the zinc in said ores to zinc sulphate and thereafter washing said zinc sulphate and excess sulphuric acid away from the residue of ore with water and forming a relatively more dilute acid solution of zinc sulphate, and concentrating said acid solution and precipitating zinc sulphate therefrom by reason of the increased concentration of the $H_2SO_4$ in said solution.

2. The process of treating sulphide ores of zinc which consists in mixing said comminuted ores and the like with an excess of hot concentrated sulphuric acid and thereby changing the zinc in said ores to zinc sulphate, and cooling said mixture of acid and ore and thereby precipitating zinc sulphate dissolved in said hot acid, and washing said zinc sulphate and the residue of excess acid away from the residue of ore with water and forming a relatively more dilute acid solution of zinc sulphate and concentrating said acid solution and precipitating zinc sulphate therefrom by reason of the increased concentration of the $H_2SO_4$ in said solution.

3. The process of treating sulphide ores of zinc which consists in mixing said comminuted ores and the like with an excess of hot concentrated sulphuric acid and thereby changing the zinc in said ores to zinc sulphate, and cooling said mixture of acid and ore and thereby precipitating zinc sulphate dissolved in said hot acid, and separating a portion of the excess of cold acid from the residue of ore and the zinc sulphate and using said acid in the treatment of more ore, and washing said zinc sulphate and the residue of excess acid away from the residue of ore with water and forming a relatively more dilute acid solution of zinc sulphate and concentrating said acid solution and precipitating zinc sulphate therefrom by reason of the increased concentration of the $H_2SO_4$ in said solution.

4. The process of treating sulphide ores of zinc which consists in mixing said comminuted ores and the like with an excess of hot concentrated sulphuric acid and thereby changing the zinc in said ores to zinc sulphate and thereafter washing said zinc sulphate and excess sulphuric acid away from the residue of ore with water and forming a relatively more dilute acid solution of zinc sulphate, and precipitating dissolved silver from said solution by the addition of a soluble chloride such as zinc chloride, and concentrating said acid solution and precipitating zinc sulphate therefrom by reason of the increased concentration of the $H_2SO_4$ in said solution.

5. The process of treating sulphide ores of zinc which consists in mixing said comminuted ores and the like with an excess of hot concentrated sulphuric acid and thereby changing the zinc in said ores to zinc sulphate, and cooling said mixture of acid and ore and thereby precipitating zinc sulphate dissolved in said hot acid, and separating a portion of the excess of cold acid from the residue of ore and the zinc sulphate and using said acid in the treatment of more ore, and washing said zinc sulphate and the residue of excess acid away from the residue of ore with water and forming a relatively more dilute acid solution of zinc sulphate and precipitating dissolved silver from said solution by the addition of a soluble chloride such as zinc chloride, and concentrating said acid solution and precipitating zinc sulphate therefrom by reason of the increased concentration of the $H_2SO_4$ in said solution.

In testimony whereof I have signed my name to this specification.

NIELS C. CHRISTENSEN.